(12) United States Patent
Suzuki et al.

(10) Patent No.: US 11,765,036 B2
(45) Date of Patent: Sep. 19, 2023

(54) CONTROL APPARATUS, CONTROL METHOD AND PROGRAM

(71) Applicant: Nippon Telegraph and Telephone Corporation, Tokyo (JP)

(72) Inventors: Akito Suzuki, Musashino (JP); Shigeaki Harada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/769,945

(22) PCT Filed: Oct. 29, 2019

(86) PCT No.: PCT/JP2019/042338
§ 371 (c)(1),
(2) Date: Apr. 18, 2022

(87) PCT Pub. No.: WO2021/084608
PCT Pub. Date: May 6, 2021

(65) Prior Publication Data
US 2022/0385536 A1    Dec. 1, 2022

(51) Int. Cl.
*H04L 29/08* (2006.01)
*H04L 41/0895* (2022.01)
*H04L 41/16* (2022.01)

(52) U.S. Cl.
CPC .......... *H04L 41/0895* (2022.05); *H04L 41/16* (2013.01)

(58) Field of Classification Search
CPC .. H04L 41/16; H04L 41/0803; H04L 41/0895
(Continued)

(56) References Cited

U.S. PATENT DOCUMENTS 7,844,839 B2 * 11/2010 Palmer ................ H04L 67/1008
718/1
8,224,993 B1 * 7/2012 Brandwine ........... G06F 1/3287
713/320
(Continued)

FOREIGN PATENT DOCUMENTS

| JP | 2009289199 | 12/2009 |
| JP | 2010092247 | 4/2010 |
| WO | WO 2019188941 | 10/2019 |

OTHER PUBLICATIONS

Shimada et al., "An introduction to deep learning with Chainer," Gijutsu-Hyoron Co., Ltd., Nov. 2, 2017, pp. 170-181, 27 pages (with English Translation).
(Continued)

*Primary Examiner* — Adnan M Mirza
(74) *Attorney, Agent, or Firm* — Fish & Richardson P.C.

(57) ABSTRACT

Provided is a control device that includes one or more processors configured to: select an agent $g_k$ that executes an action that represents allocation of a virtual network onto a physical network at a time point t from a plurality of agents; observe a state $s_t$ at the time point t with an input of network configuration information of the physical network, network observation information, and user demand information; select and execute, on basis of an action value function Q representing an expected value of a sum total of a reward received in future, an action $a_t^k$ from possible actions for the agent $g_k$; calculate a reward $r_t$ using of the action $a_t^k$, the state $s_t$, and a state $s_{t+1}$ at a time point t+1; and update the action value function Q with use of the action $a_j^k$, the state $s_j$, and the state $s_{j+1}$, where $1 \leq j \leq t$ is satisfied.

15 Claims, 5 Drawing Sheets

(58) Field of Classification Search
USPC .......................................................... 709/223
See application file for complete search history.

(56) References Cited

U.S. PATENT DOCUMENTS

| | | | |
|---|---|---|---|
| 10,334,032 B2 * | 6/2019 | Sun | H04L 41/0803 |
| 10,996,733 B2 * | 5/2021 | Lee | G06Q 10/04 |
| 2014/0298349 A1 * | 10/2014 | Jackson | G06F 1/3206 |
| | | | 718/104 |
| 2019/0102213 A1 * | 4/2019 | Yousaf | H04L 41/147 |
| 2020/0272775 A1 | 8/2020 | Nakagawa | |

OTHER PUBLICATIONS

Suzuki et al., "A method of coordinating multiple control algorithms for NFV," IEICE Technical Report, 2017, 116(485):37-42, 13 pages (with English Translation).

Suzuki et al., "A Study on Dynamic Virtual Network Allocation Method with Deep Reinforcement Learning," 2019 IEICE General Conference, Mar. 19, 2019, 3 pages (with English Translation).

Suzuki, "Dynamic Virtual Resource Allocation Method Using Multi-agent Deep Reinforcement Learning," Technical Report of IEICE, 2019, 119(195):1-6, 13 pages (with English Translation).

* cited by examiner

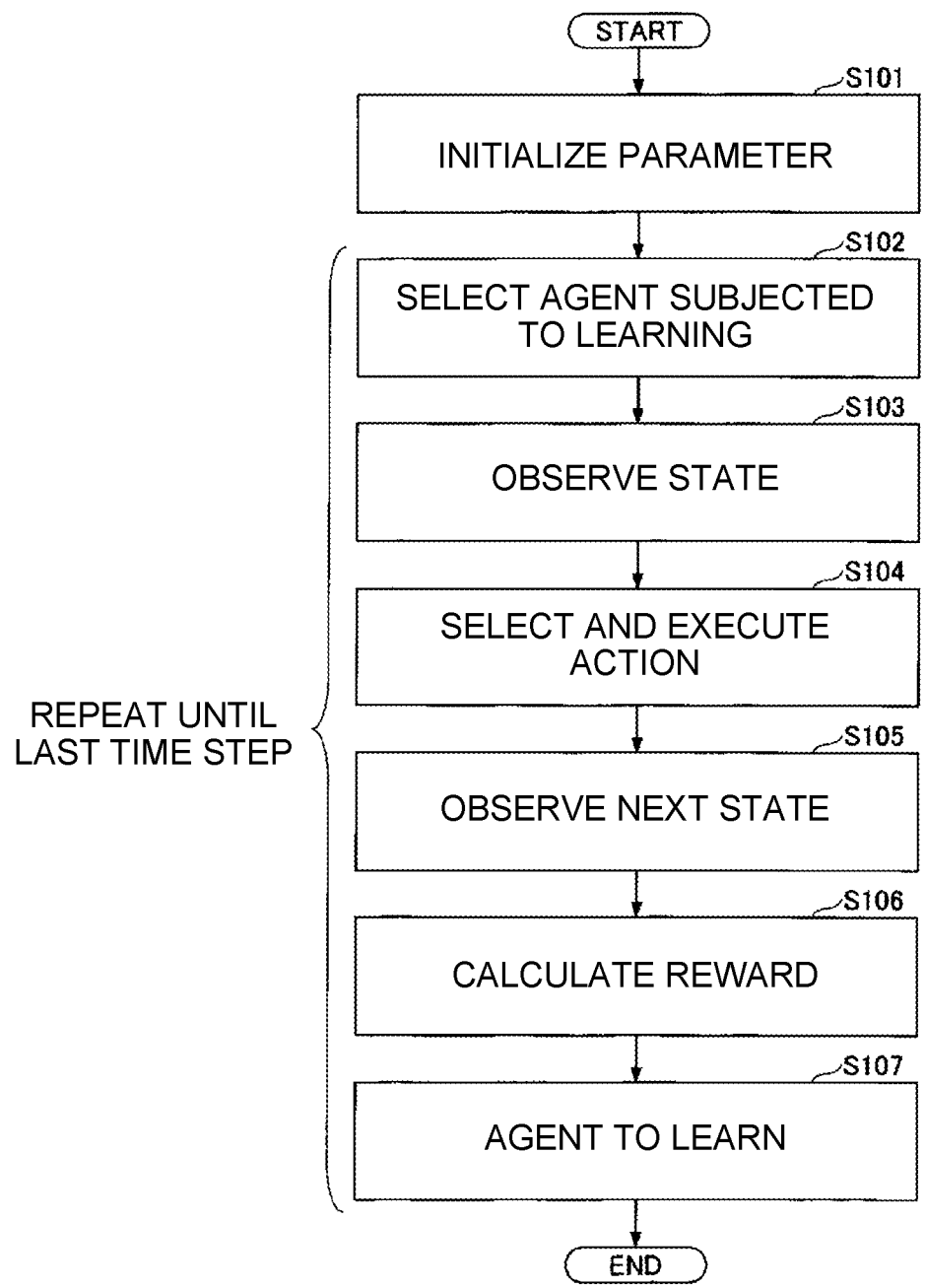

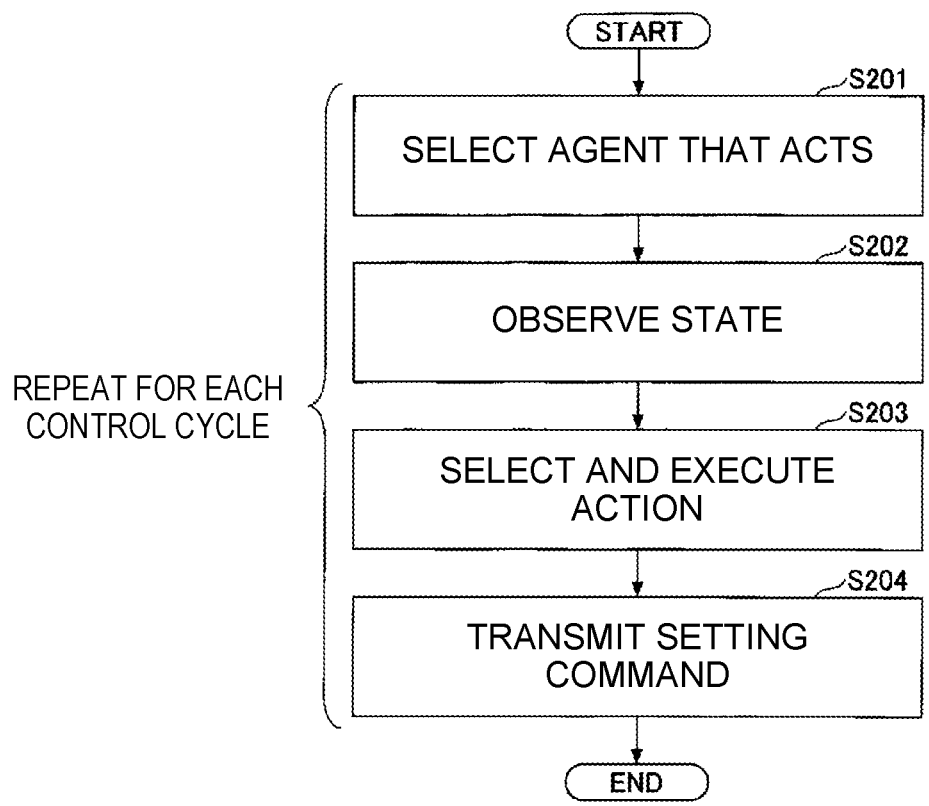

CONTROL APPARATUS, CONTROL METHOD AND PROGRAM

CROSS-REFERENCE TO RELATED APPLICATIONS

This application is a National Stage application under 35 U.S.C. § 371 of International Application No. PCT/JP2019/042338, having an International Filing Date of Oct. 29, 2019. The disclosure of the prior application is considered part of the disclosure of this application, and is incorporated in its entirety into this application.

TECHNICAL FIELD

The present invention relates to a control device, a control method, and a program.

BACKGROUND ART

A technology called network function virtualization (NFV) that enables various network services to be provided by flexibly combining virtual network functions (VNFs) is known. Those network services are provided by allocating virtual networks (VNs) built by a service provider to physical resources of a telecommunications carrier.

Incidentally, in recent years, fluctuation of the demand for physical resources such as a server and traffic is intensifying due to high-image-quality video distribution, the update of operating systems (OSs), and the like. Therefore, the demand for physical resources of the virtual networks built by the service provider often temporally fluctuates. Meanwhile, a technology that dynamically controls the allocation of the virtual networks during the provision of the network services in accordance with the fluctuation of the demand for the physical resources is known. For example, a dynamic allocation method of virtual networks that can follow the demand fluctuation by learning the relationship between the network state and the optimal control method in advance by deep reinforcement learning and eliminating the use of calculation time at the time of actual control is known (Non-Patent Literature 1).

CITATION LIST

Patent Literature

Non-Patent Literature

Non-Patent Literature 1: Akito Suzuki, Yu Abiko, Harada Shigeaki, "Shinsou kyouka gakushu ni yoru douteki kasou nettowa-ku wariate shuhou no kentou (in Japanese) (Examination of dynamic virtual network allocation method by deep reinforcement learning)", The IEICE General Conference, p. 1, B-7-48, 2018.

SUMMARY OF THE INVENTION

Technical Problem

However, in the dynamic allocation method disclosed in Non-Patent Literature 1, calculation time necessary for prior-learning may increase with respect to the increase of the number of servers, the increase of the number of virtual networks, and the like. The resetting of the network equipment and the migration of virtual machines (VMs) may increase. As a result, a control cycle in the actual control may increase, and the allocation accuracy of the virtual networks may decrease.

An embodiment of the present invention has been made in view of the abovementioned points, and an object thereof is to efficiently realize dynamic allocation of a virtual network with high accuracy.

Means for Solving the Problem

In order to achieve the abovementioned object, a control device according to an embodiment of the present invention is a control device that dynamically allocates a virtual network for providing a network service on a physical network by multi-agent deep reinforcement learning, the control device including: selection means for selecting an agent $g_k$ that executes an action that represents allocation of the virtual network onto the physical network at a time point t from a plurality of agents; observation means for observing a state $s_t$ at the time point t with an input of network configuration information of the physical network, network observation information indicating a physical resource amount of the physical network, and user demand information indicating an amount demanded for a physical resource generated by a communication action of a user terminal of the network service; allocation means for selecting and executing, on basis of an action value function Q that represents an expected value of a sum total of a reward received in future, an action $a_t^k$ from possible actions for the agent $g_k$ selected by the selection means; reward calculation means for calculating a reward $r_t$ at the time point t with use of the action $a_t^k$ selected and executed by the allocation means, the state $s_t$, and a state $s_{t+1}$ at a time point t+1 observed by the observation means; and learning means for updating the action value function Q with use of the action $a_j^k$, the state $s_j$, and the state $s_{j+1}$, where $1 \leq j \leq t$ is satisfied.

Effects of the Invention

The dynamic allocation of the virtual network can be efficiently realized with high accuracy.

BRIEF DESCRIPTION OF DRAWINGS

FIG. 4 is a flowchart illustrating one example of prior-learning processing according to this embodiment.

FIG. 5 is a flowchart illustrating one example of dynamic VN allocation processing according to this embodiment.

DESCRIPTION OF EMBODIMENTS

An embodiment of the present invention is described in detail below with reference to the drawings. In this embodiment, a network control device 100 that can efficiently realize dynamic allocation of a virtual network with high accuracy is described.

<Overall Configuration>

Figure 1:
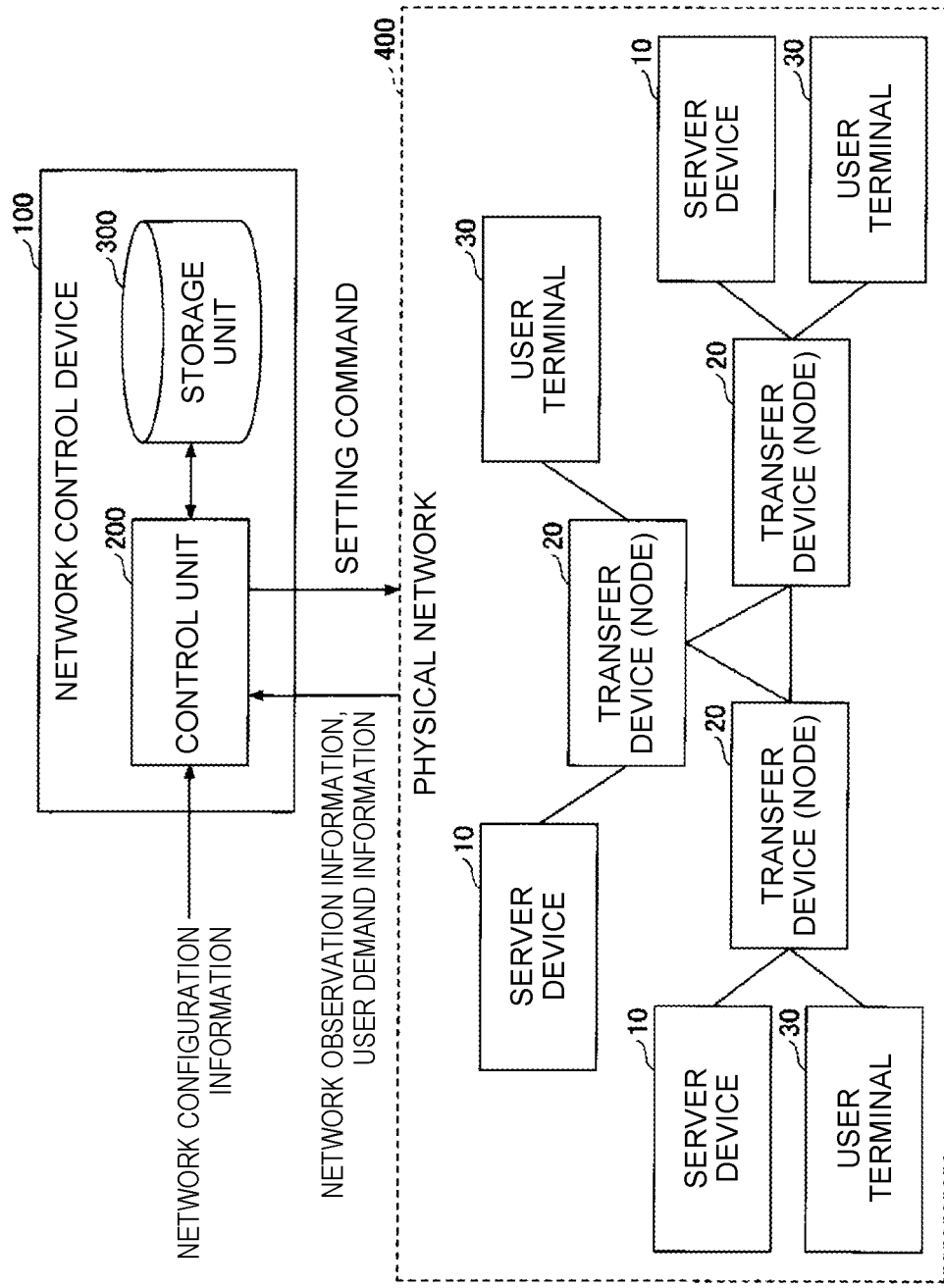
FIG. 1 is a diagram illustrating one example of the overall configuration of a system including a network control device according to an embodiment of the present invention.

First, the overall configuration of a system including the network control device 100 according to this embodiment is described with reference to FIG. 1. FIG. 1 is a diagram illustrating one example of the overall configuration of the system including the network control device 100 according to this embodiment.

As illustrated in FIG. 1, the network control device 100 according to this embodiment is connected to a physical network 400. The physical network 400 is a network environment of a telecommunications carrier, and includes a server device 10, a transfer device 20, and a user terminal 30, for example.

The network control device 100 is a computer or a computer system that dynamically allocates a virtual network (hereinafter also simply referred to as a "VN") built by a service provider onto the physical network 400 (in other words, the network control device 100 is a computer or a computer system that functions as an NFV orchestrator). The network control device 100 includes a control unit 200 and a storage unit 300.

The control unit 200 realizes dynamic VN allocation capable of following a physical resource demand (hereinafter also referred to as a "VN demand") of the virtual network (in other words, capable of following the fluctuation of the VN demand) by learning the relationship between a network state (hereinafter also simply referred to as an "NW state") of the physical network 400 and an optimal VN allocation method in advance by multi-agent deep reinforcement learning.

The NW state is an amount (for example, the server capacity of each server device 10, the capacity of each transfer device 20, and the capacity of a link included in the physical network 400) of each physical resource included in the physical network 400, for example. The physical resource demand of a virtual network is an amount demanded for a physical resource necessary for realizing a network service by the virtual network, and is a traffic demand and a virtual machine demand (hereinafter also simply referred to as a "VM demand"), for example. The traffic demand is a traffic amount (in other words, a data amount) necessary in a certain link included in the physical network 400. The VM demand is the number of VMs that needs to be built (placed) on the server device 10.

The VN allocation is the placement of the VMs on the server device 10 and the determination of an optimal route from the user terminal 30 to the VMs, for example. The VN allocation is performed when a setting command for realizing the VN allocation is transmitted to each of the server devices 10 and each of the transfer devices 20 from the control unit 200.

The NW state and the VN demand (in other words, the traffic demand and the VM demand) described above are acquired from network configuration information, network observation information, user demand information, and the like input from the network control device 100.

The network configuration information is network topology information of the physical network 400 and constraint conditions of the physical resources (for example, the amount of the physical resources described above), for example. The network observation information is traffic information indicating the traffic of each link configuring the physical network 400 and server usage information indicating the server capacity of each of the server devices 10 and the number of the VMs, for example. The user demand information is information indicating the VN demand (in other words, the traffic demand and the VM demand) of the user terminal 30, for example.

The storage unit 300 stores therein various information (for example, the network configuration information, the network observation information, and the user demand information) necessary for prior-learning and the dynamic VN allocation by the control unit 200.

The multi-agent deep reinforcement learning is deep reinforcement learning using a plurality of agents. In this embodiment, a VN allocation problem of the entire physical network 400 is divided into a plurality of subproblems, an agent is prepared for each subproblem, and prior-learning is performed by deep reinforcement learning. More specifically, the VN demand for the entire physical network 400 is divided into a plurality of groups, an agent is prepared for each group, and prior-learning of each of the agents is performed by deep reinforcement learning. As a result, the increase of the calculation time necessary for the prior-learning can be prevented with respect to the increase of the number of VNs, the increase of the number of the server devices 10, and the like. In other words, the scalability for the number of VNs and the number of the server devices 10 can be improved. The VN allocation problem is one type of an optimization problem and is also referred to as a virtual network embedding (VNE) problem.

In this embodiment, the number of agents that can act in each control cycle is limited to one. As a result, the VN allocation amount (for example, the number of changes, frequency, and the like relating to the resetting of the network equipment, the migration of the VM, and the like) in each control cycle can be suppressed, and the decrease of the VN allocation accuracy due to the increase of the control cycle can be prevented. The decrease of the VN allocation accuracy caused when a conflict in VN allocation occurs among agents can also be prevented.

The server device 10 is a computer or a computer system that realizes the VM placed by the network control device 100. The server device 10 collects the server usage information, and transmits the collected server usage information to the network control device 100. The server device 10 processes traffic in accordance with a function realized by the VM placed by the network control device 100, and generates traffic. Hereinafter, when the plurality of server devices 10 are distinguished from each other, an index of the server device 10 is applied to the lower right, and the plurality of server devices 10 are expressed as a "server device $10_1$", a "server device $10_2$", and the like.

The transfer device 20 is network equipment that functions as a node that transfers traffic. The transfer device 20 collects the traffic information, and transmits the collected traffic information to the network control device 100. The transfer device 20 processes the traffic in accordance with route information. The route information is information indicating a route between the user terminal 30 and the VM, for example.

The user terminal 30 is a computer that transmits traffic generated by a communication action (for example, usage start operation of the network service) of a user to the server device 10 and the like. The user terminal 30 transmits the user demand information to the network control device 100.

<Configuration of Multi-Agent Deep Reinforcement Learning>

As described above, in this embodiment, the dynamic VN allocation is realized by learning the relationship between the NW state of the physical network 400 and the optimal VN allocation method in advance by the multi-agent deep reinforcement learning. Thus, hereinafter, a configuration example of the multi-agent deep reinforcement learning is described. In this embodiment, as one example, a method called deep Q-network (DQN) or deep Q-learning that is one of deep reinforcement learning is used.

In this embodiment, each time point for each control cycle is represented by t as a time step, and the prior-learning and the dynamic VN allocation are executed for each time step t. In the prior-learning, the amount of time for the control cycle does not necessarily need to actually pass before transition to the next time step is performed.

At this time, the symbols used in this embodiment are defined as indicated in Table 1 and Table 2 below.

TABLE 1

| Symbol | Definition |
| --- | --- |
| N | Number of VNs |
| I | Index of link |
| L | Total number of links |
| s | Index of server device 10 |
| S | Total number of server devices 10 |
| $U_t^L = \max_l(u_t^l)$ | Maximum link usage rate |
| $u_t^l$ | Link usage rate of link l |
| $U_t^S = \max_s(u_t^s)$ | Maximum server usage rate |
| $u_t^s$ | Server usage rate of server device $10_s$ |
| $E_t^{NW}$ | Network usage efficiency |
| $D_t := \{d_t^i\}$ | Traffic demand of i-th VN |
| $V_t := \{v_t^i\}$ | VM demand of i-th VN |
| $A_t := \{A_t^i\}$ | VM placement of i-th VN |
| $R_t^l$ | Remaining link capacity of link l |
| $R_t^s$ | Remaining server capacity of server device $10_s$ |

TABLE 2

| Symbol | Definition |
| --- | --- |
| M | Number of agents |
| T | Total time steps |
| e | Episode |
| E | Total episodes |
| $G := \{g_k\}$ | Set of agents ($1 \le k \le M$) |
| $S_t$ | State |
| $a_t^k$ | Action of k-th agent |
| $r_t$ | Reward |
| $Q(s_t, a_t^k)$ | Action value function |
| $p^k$ | Replay memory of k-th agent |

Hereinafter, M is an integer equal to or more than two, and N is a multiple of M. When N is not a multiple of M, the value of N or M or the values of both of N and M only need to be adjusted, as appropriate, such that N becomes a multiple of M.

As the constraint condition and objective functions of the VN allocation problem, the constraint condition is that each of a maximum link usage rate $U_t^L$ and a maximum server usage rate $U_t^S$ is 0 or more and 1 or less, and a network usage efficiency $E_t^{NW}$ and the number of times of VN reallocation are the objective functions. The network usage efficiency $E_t^{NW}$ is defined by Expression (1) below.

$$E_t^{NW} = 1 - \frac{U_t^L + U_t^S}{2} \qquad (1) \qquad \text{[Math. 1]}$$

In other words, the network usage efficiency $E_t^{NW}$ increases as the maximum link usage rate $U_t^L$ and the maximum server usage rate $U_t^S$ decrease.

In this embodiment, the state and the reward of the deep reinforcement learning are common among the agents, and only the actions are different for each agent. First, a state $s_t$ in a time step t is defined as follows.

$$s_t = [d_t^1, \ldots, d_t^1, v_t^1, \ldots, v_t^N, R_t^1, \ldots, R_t^L, R_t^1, \ldots, R_t^S] \qquad \text{[Math 2]}$$

A traffic demand $D_t$ and a VM demand $V_t$ can be acquired from the user demand information. A remaining link capacity $R_t^1$ and a remaining server capacity $R_t^s$ can be calculated or acquired from the network configuration information and the network observation information.

Next, an action $a_t^k$ of an agent $g_k$ is the VN allocation. The VN allocation for one certain VN demand is determined by a combination of one VM and the server device 10 on which the VM is placed, and a route from the user terminal 30 corresponding to the VN demand to the server device 10 is uniquely determined. The VN demand is divided into the same number of groups as a number M of agents, and the agent $g_k$ performs the VN allocation for a VN demand belonging to a k-th group. Therefore, the number of VN allocations (in other words, the number of candidates for the action $a_t^k$) that may be performed by the agent $g_k$ as the action $a_t^k$ is a number $S^{N/M}$ of combinations by which the VM is placed on any of the server devices 10 out of a number of S server devices 10 for each of a number of N/M VN demands.

For example, in the dynamic allocation method disclosed in Non-Patent Literature 1 described above, the number of possible actions for an agent as an action $a_t$ is $S^N$. Therefore, in this embodiment, as compared to the dynamic allocation method disclosed in Non-Patent Literature 1 described above, the calculation time (in other words, calculation cost) necessary for the learning of each agent can be reduced. In this embodiment, the number of VNs that are reallocated can be limited to a maximum of N/M by limiting the number of agents that can act in each time step t to one. As a result, the decrease of the VN allocation accuracy due to the increase of the control cycle at the time of the dynamic VN allocation (in other words, at the time of the actual control) can be prevented. The VN reallocation means that the locations of a physical resource are different before and after the VN allocation for the same VN (in other words, in this embodiment, the VN reallocation refers to a case where the server device 10 on which the VM is placed is different before and after the VN allocation for the same VN).

Next, as design guidelines of a reward $r_t$ in the time step t, a large negative value is given as the reward $r_t$ when the constraint condition is not satisfied in this embodiment. When the VN reallocation occurs, a value in accordance with the improvement degree or the deterioration degree of the network usage efficiency $E_t^{NW}$ is given as the reward $r_t$. A negative value is uniformly given as the reward $r_t$ when the network usage efficiency $E_t^{NW}$ is high in order to suppress unnecessary VN reallocation. For example, the reward $r_t$ is defined as below within the range of $-1 \le r_t \le 1$ on the basis of the design guidelines as above.

(1) when $U_t^L > 1$ or $U_t^S > 1$ is satisfied, $r_t = -1$
(2) when $U_t^L > 0.9$ or $U_L^S > 0.9$ is satisfied, $r_t \leftarrow r_t - 0.2$
(3) when there is a VN reallocation and "$U_t^L < 0.6$ or $U_t^S < 0.6$" is satisfied, $r_t \leftarrow r_t - 0.2$
(4) when there is a VN reallocation, $r_t \leftarrow r_t + 2 \, (E_{t+1}^{NW} - E_t^{NW})$
(5) for cases other than the abovementioned (1) to (4), $r_t = 0$ Here, "a←b" means that a is updated to b.

<Hardware Configuration of Network Control Device 100>

Figure 2:
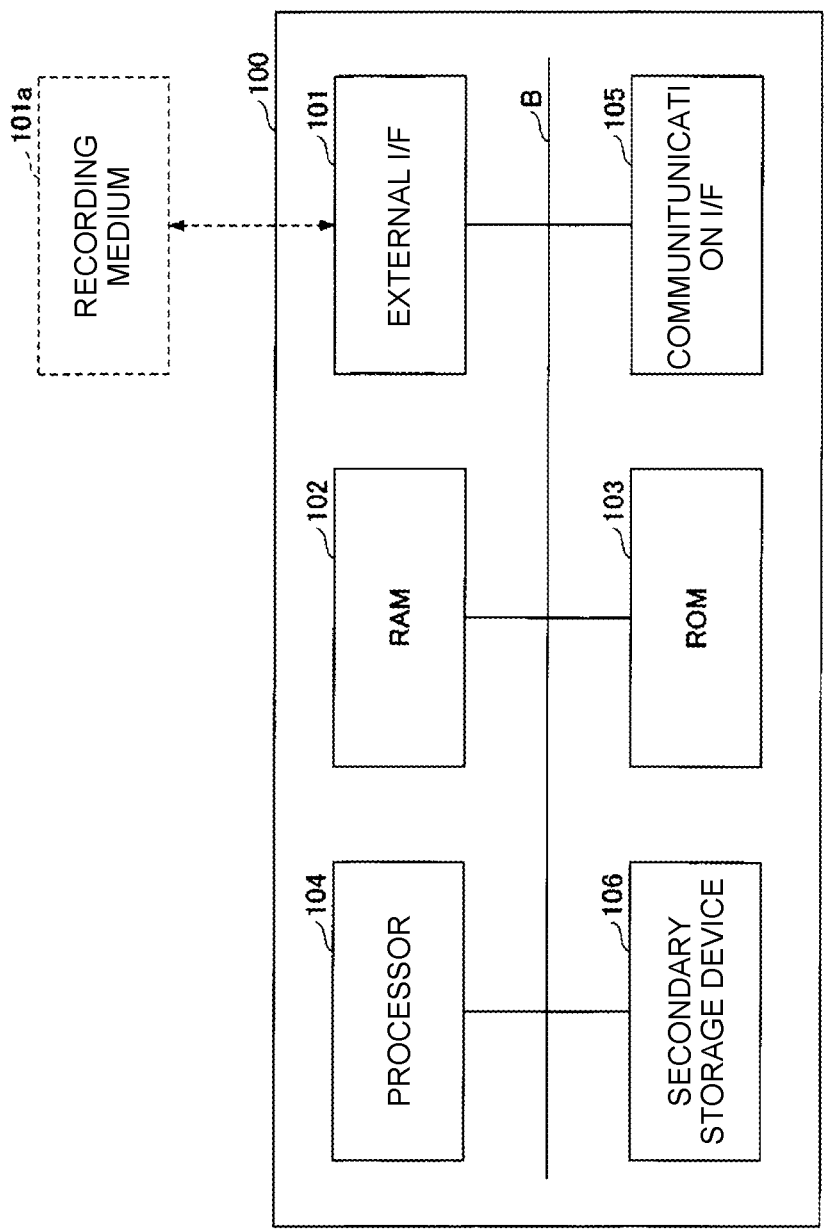
FIG. 2 is a diagram illustrating one example of a hardware configuration of the network control device according to this embodiment.

Next, a hardware configuration of the network control device 100 according to this embodiment is described with reference to FIG. 2. FIG. 2 is a diagram illustrating one example of the hardware configuration of the network control device 100 according to this embodiment.

As illustrated in FIG. 2, the network control device 100 according to this embodiment includes, as hardware, an external I/F 101, a random access memory (RAM) 102, a read only memory (ROM) 103, a processor 104, a communication I/F 105, and a secondary storage device 106. Each of the hardware is connected to each other via a bus B in a manner in which communication is possible.

The external I/F 101 is an interface between the network control device 100 and an external device. The external device is a recording medium 101a and the like. The network control device 100 can perform reading, writing, and the like of the recording medium 101a via the external I/F 101.

The recording medium 101a is, for example, a flexible disk, a compact disc (CD), a digital versatile disk (DVD), a secure digital memory card (SD memory card), a universal serial bus (USB) memory card, or the like.

The RAM 102 is a volatile semiconductor memory that temporarily holds programs and data. The ROM 103 is a nonvolatile semiconductor memory that can hold programs and data even when the power is turned off. In the ROM 103, setting information relating to an OS and setting information relating to a communication network, for example, are stored.

The processor 104 is a central processing unit (CPU) or a graphics processing unit (GPU), for example, and is an arithmetic device that executes processing by reading out programs and data from the ROM 103, the secondary storage device 106, and the like onto the RAM 102.

The communication I/F 105 is an interface for connecting the network control device 100 to the physical network 400.

The secondary storage device 106 is a hard disk drive (HDD) or a solid state drive (SSD), for example, and stores various programs and data therein. The programs and data stored in the secondary storage device 106 are an OS, application software that realizes various functions on the OS, and one or more programs that realize the control unit 200, for example.

The storage unit 300 can be realized with use of the secondary storage device 106, for example. The storage unit 300 may be realized by a storage device, a database server, and the like connected to the network control device 100 over the communication network, for example.

The network control device 100 according to this embodiment can realize prior-learning processing and dynamic VN allocation processing described below by having the hardware configuration illustrated in FIG. 2. The hardware configuration illustrated in FIG. 2 is one example, and the network control device 100 according to this embodiment may have other hardware configurations. For example, the network control device 100 according to this embodiment may have a plurality of the processors 104 or may have a plurality of memory devices (the RAM 102, the ROM 103, the secondary storage device 106, and the like). For example, the network control device 100 according to this embodiment may have a display device such as a display, and an input device such as a keyboard and a mouse in addition to the abovementioned hardware.

<Function Configuration of Control Unit 200>

Figure 3:
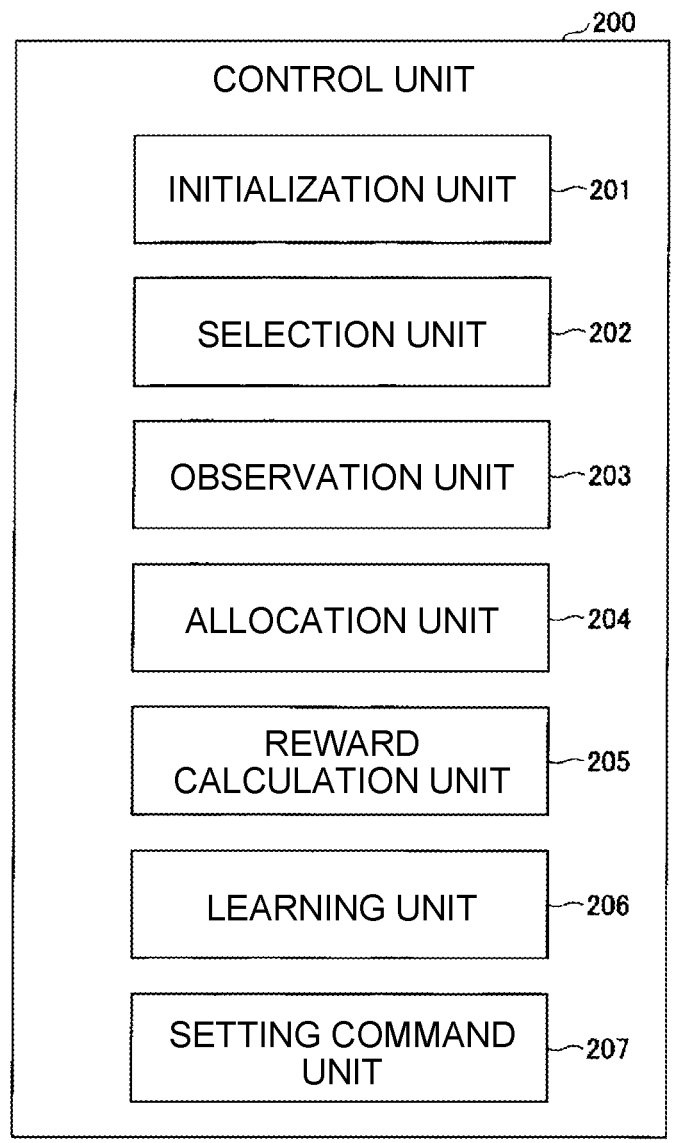
FIG. 3 is a diagram illustrating one example of a function configuration of a control unit according to this embodiment.

Next, a function configuration of the control unit 200 according to this embodiment is described with reference to FIG. 3. FIG. 3 is a diagram illustrating one example of the function configuration of the control unit 200 according to this embodiment.

As illustrated in FIG. 3, the control unit 200 according to this embodiment includes an initialization unit 201, a selection unit 202, an observation unit 203, an allocation unit 204, a reward calculation unit 205, a learning unit 206, and a setting command unit 207. The control unit 200 is realized by processing caused to be executed by the processor 104 by one or more programs stored in the secondary storage device 106, for example.

The initialization unit 201 performs initial setting and the like of various parameters in the prior-learning. Examples of parameters of which initial setting is to be performed include the number M of agents, a number N of VNs, a total number L of links, a total number S of the server devices 10, and total time steps T.

The selection unit 202 selects the agent $g_k$ subjected to learning from an agent set G in the prior-learning. The selection unit 202 selects the agent $g_k$ that acts from the agent set G in the dynamic VN allocation.

The observation unit 203 observes the state $s_t$ for each time step t in the prior-learning and the dynamic VN allocation. As defined above, the state $s_t$ includes the traffic demand, the VM demand, the remaining link capacity, and the remaining server capacity in the time step t. Therefore, the observation unit 203 can observe the state $s_t$ when the network configuration information, the network observation information, and the user demand information are input.

The allocation unit 204 performs the VN allocation by selecting and executing the action $a_t^k$ of the agent $g_k$ selected by the selection unit 202 in the prior-learning and the dynamic VN allocation.

The reward calculation unit 205 calculates the reward $r_t$ in the prior-learning. A link usage rate $u_t^l$ necessary for acquiring the maximum link usage rate $U_t^L$ can be calculated or acquired from the network configuration information and the network observation information. Similarly, a server usage rate $u_t^s$ necessary for acquiring the maximum server usage rate $U_t^S$ can be calculated or acquired from the network configuration information and the network observation information.

The reward calculation unit 205 correlates $s_t$, $a_t^k$, $r_t$, and $s_{t+1}$ with each other and stores the correlated $s_t$, $a_t^k$, $r_t$, and $s_{t+1}$ into a replay memory. The replay memory can be realized with use of the RAM 102 and the secondary storage device 106, for example. A tuple ($s_t$, $a_t^k$, $r_t$, $s_{t+1}$) in which $s_t$, $a_t^k$, $r_t$, and $s_{t+1}$ are correlated with each other is also referred to as a learning sample.

The learning unit 206 updates an action value function $Q(s_t, a_t^k)$ such that the reward $r_t$ received in the future becomes highest with use of a learning sample ($s_j$, $a_j^k$, $r_j$, $s_{j+1}$) randomly selected from the replay memory in the prior-learning. As a result, the agent $g_k$ is subjected to learning. The action value function represents an expected value of a sum total (the sum total is also referred to as a gain) of the reward received in the future.

The setting command unit 207 transmits a setting command for realizing the VN allocation represented by the action $a_t^k$ executed by the allocation unit 204 to the server device 10, the transfer device 20, and the like in the dynamic VN allocation. In this way, the VMs are placed to the server devices 10 and the settings of the transfer devices 20 are changed such that the VN allocation is realized.

<Prior-Learning Processing>

Next, the prior-learning processing executed before the dynamic VN allocation is performed is described with reference to FIG. 4. FIG. 4 is a flowchart illustrating one example of the prior-learning processing according to this embodiment. Step S101 to Step S106 in FIG. 4 are repeatedly executed from episodes e=0 to e=E. The prior-learning processing ends when a predetermined termination condition (for example, $r_t$=−1) is satisfied.

Step S101: First, the initialization unit 201 performs the initial setting of various parameters. At this time, the initialization unit 201 may generate the network observation information and the user demand information to be used in the prior-learning and store the generated network observation information and the user demand information in the storage unit 300.

Step S102 to Step S107 thereafter are repeatedly executed from time steps t=1 to t=T (in other words, Step S102 to Step S107 are repeatedly executed for T times for each episode). Step S102 to Step S107 in a certain time step t are described below.

Step S102: The selection unit 202 selects the agent $g_k$ subjected to learning from the agent set G. For example, the selection unit 202 only needs to select the agent $g_k$ subjected to learning by setting a remainder obtained by dividing t by M to k (in other words, k=t mod M).

Step S103: The observation unit 203 observes the state $s_t$ when the network configuration information, the network observation information, and the user demand information in the time step t are input. When the network configuration information does not change in each time step t, the network configuration information only needs to be input for the first time only (in other words, only when t=1).

Step S104: Next, the allocation unit 204 selects and executes the action $a_t^k$ of the agent $g_k$ selected in Step S102 described above. At this time, the allocation unit 204 randomly selects the action $a_t^k$ at the probability of 1−ε and selects the action $a_t^k$ with which the action value function $Q(s_t, a_t^k)$ becomes highest at the probability of 1−ε. As a result, the VN allocation represented by the action $a_t^k$ that is selected and executed is performed, and VM placement $A_{t+1}$ is updated. Here, $A_{t+1}=\{A_{t+1}^i\}$ represents an index of the server device 10 for which a VM is placed for each VN, for example.

Step S105: Next, the observation unit 203 observes the state $s_{t+1}$ when the network configuration information, the network observation information, and the user demand information in the time step t+1 are input.

Step S106: Next, the reward calculation unit 205 calculates the reward $r_t$ with use of the state $s_t$, the action $a_t^k$, and the state $s_{t+1}$. The reward calculation unit 205 stores the learning sample ($s_t, a_t^k, r_t, s_{t+1}$) in the replay memory.

Step S107: Then, the learning unit 206 updates the action value function $Q(s_t, a_t^k)$ such that the reward $r_t$ received in the future becomes the highest with use of the learning sample ($s_j, a_j^k, r_j, s_{j+1}$) randomly selected from the replay memory. In this way, the agent $g_k$ is subjected to learning. The learning unit 206 only needs to update the action value function $Q(s_t, a_t^k)$ by a known update expression used in deep Q-learning, deep Q-network, or the like.

By the above, in the network control device 100 according to this embodiment, the agent $g_k$ can be subjected to learning such that the reward $r_t$ received in the future becomes the highest (in other words, such that the network usage efficiency increases and the number of VN reallocations decreases). In the network control device 100 according to this embodiment, the plurality of VN demands are divided into a number of M groups, and the VN allocation for the VN demand belonging to the k-th group is learned by the agent $g_k$. As a result, the increase of calculation time with respect to the increase of the number of VNs, the increase of the number of the server devices 10, and the like can be prevented.

<Dynamic VN Allocation Processing>

Next, the dynamic VN allocation processing executed while the network service is provided is described with reference to FIG. 5. FIG. 5 is a flowchart illustrating one example of the dynamic VN allocation processing according to this embodiment. Step S201 to Step S204 below are repeatedly executed for each control cycle (in other words, for each time step t).

Step S201: First, the selection unit 202 selects the agent $g_k$ that acts from the agent set G. For example, the selection unit 202 only needs to select the agent $g_k$ that acts by setting a remainder obtained by dividing t by M to be k (in other words, k=t mod M).

Step S202: Next, the observation unit 203 observes the state $s_t$ when the network configuration information, the network observation information, and the user demand information in the time step t are input. When the network configuration information does not change in each time step t, the network configuration information only needs to be input for the first time only (in other words, only when t=1).

Step S203: Next, the allocation unit 204 selects and executes the action $a_t^k$ of the agent $g_k$ selected in Step S201 described above. At this time, the allocation unit 204 selects the action $a_t^k$ with which the action value function $Q(s_t, a_t^k)$ becomes the highest.

Step S204: Then, the setting command unit 207 transmits a setting command for realizing the VN allocation represented by the action $a_t^k$ executed in Step S203 described above to the server device 10, the transfer device 20, and the like. As a result, the VMs are placed in the server devices 10, the settings of the transfer devices 20 are changed, and the VN allocation represented by the action $a_t^k$ executed in Step S203 described above is realized.

By the above, in the network control device 100 according to this embodiment, efficient VN allocation (in other words, VN allocation in which the network usage efficiency is high and the number of VN reallocations is small) can be realized in each control cycle by the agent set G learned in advance. In the network control device 100 according to this embodiment, by limiting the number of agents that can act in each control cycle to one, the number of VNs that can be reallocated in each control cycle is limited, and the decrease of the VN allocation accuracy due to the increase of the control cycle can be prevented. The decrease of the VN allocation accuracy caused when a conflict in VN allocation occurs among the agents can also be prevented.

The present invention is not limited to the abovementioned embodiment that is specifically disclosed, and various modifications, changes, combinations with other technologies, and the like are possible without departing from the description of the claims.

REFERENCE SIGNS LIST

10 Server device
20 Transfer device
30 User terminal
100 Network control device
101 External I/F
101a Recording medium
102 RAM 103 ROM
104 Processor
105 Communication I/F
106 Secondary storage device
200 Control unit
201 Initialization unit
202 Selection unit
203 Observation unit
204 Allocation unit
205 Reward calculation unit
206 Learning unit
207 Setting command unit
300 Storage unit
400 Physical network

The invention claimed is:

1. A control device that dynamically allocates a virtual network for providing a network service on a physical network by multi-agent deep reinforcement learning, the control device comprising:
one or more processors configured to:
select an agent $g_k$ that executes an action that represents allocation of the virtual network onto the physical network at a time point t from a plurality of agents;
observe a state $s_t$ at the time point t with an input of network configuration information of the physical network, network observation information indicating a physical resource amount of the physical network, and user demand information indicating an amount demanded for a physical resource generated by a communication action of a user terminal of the network service;
select and execute, on basis of an action value function Q that represents an expected value of a sum total of a reward received in future, an action $a_t^k$ from possible actions for the agent $g_k$;
calculate a reward $r_t$ at the time point t with use of the action $a_t^k$, the state $s_t$, and a state $s_{t+1}$ at a time point t+1; and
update the action value function Q with use of the action $a_j^k$, the state $s_j$, and the state $s_{j+1}$, where $1 \le j \le t$ is satisfied.

2. The control device according to claim 1, wherein:
a total number of virtual networks is N; and
the one or more processors are configured to select the agent $g_k$ that executes the action that represents the allocation of the virtual network that belongs to a k-th group out of groups each having a number of N/M virtual networks obtained by dividing the number of N virtual networks.

3. The control device according to claim 2, wherein the one or more processors are configured to select the agent $g_k$, where k=t mod M is satisfied.

4. The control device according to claim 1, wherein the one or more processors are configured to:
store a tuple of the action $a_j^k$, the state $s_j$, and the state $s_{j+1}$ in a replay memory; and
randomly select the j, and updates the action value function Q with use of the action $a_j^k$, the state $s_j$, and the state $s_{j+1}$ included in a tuple corresponding to the j out of the tuple stored in the replay memory.

5. The control device according to claim 1, wherein the reward $r_t$ becomes a higher value as a network usage efficiency defined by a usage rate of a server included in the physical network and a usage rate of a link included in the physical network becomes higher, and becomes a higher value as a number of changes of the physical resource allocated to the virtual network increases.

6. A control method for dynamically allocating a virtual network for providing a network service on a physical network by multi-agent deep reinforcement learning, the control method comprising:
selecting an agent $g_k$ that executes an action that represents allocation of the virtual network onto the physical network at a time point t from a plurality of agents;
observing a state $s_t$ at the time point t with an input of network configuration information of the physical network, network observation information indicating a physical resource amount of the physical network, and user demand information indicating an amount demanded for a physical resource generated by a communication action of a user terminal of the network service;
selecting and executing, on basis of an action value function Q that represents an expected value of a sum total of a reward received in future, an action $a_t^k$ from possible actions for the agent $g_k$;
calculating a reward $r_t$ at the time point t with use of the action $a_t^k$, the state $s_t$, and a state $s_{t+1}$ at a time point t+1; and
learning procedure of updating the action value function Q with use of the action $a_j^k$, the state $s_j$, and the state $s_{j+1}$, where $1 \le j \le t$ is satisfied.

7. A non-transitory computer readable medium storing one or more instructions for causing a computer to function as a control device that dynamically allocates a virtual network for providing a network service on a physical network by multi-agent deep reinforcement learning to execute:
selecting an agent $g_k$ that executes an action that represents allocation of the virtual network onto the physical network at a time point t from a plurality of agents;
observing a state $s_t$ at the time point t with an input of network configuration information of the physical network, network observation information indicating a physical resource amount of the physical network, and user demand information indicating an amount demanded for a physical resource generated by a communication action of a user terminal of the network service;
selecting and executing, on basis of an action value function Q that represents an expected value of a sum total of a reward received in future, an action $a_t^k$ from possible actions for the agent $g_k$;
calculating a reward $r_t$ at the time point t with use of the action $a_t^k$, the state $s_t$, and a state $s_{t+1}$ at a time point t+1; and
learning procedure of updating the action value function Q with use of the action $a_j^k$, the state $s_j$, and the state $s_{j+1}$, where $1 \le j \le t$ is satisfied.

8. The control method according to claim 6, wherein:
a total number of virtual networks is N; and
the control method comprises: selecting the agent $g_k$ that executes the action that represents the allocation of the virtual network that belongs to a k-th group out of groups each having a number of N/M virtual networks obtained by dividing the number of N virtual networks.

9. The control method according to claim 8, comprising: selecting the agent $g_k$, where k=t mod M is satisfied.

10. The control method according to claim 6, comprising: storing a tuple of the action $a_j^k$, the state $s_j$, and the state $s_j+1$ in a replay memory; and
randomly selecting the j, and updates the action value function Q with use of the action $a_j^k$, the state si, and the state $s_{j+1}$ included in a tuple corresponding to the j out of the tuple stored in the replay memory.

11. The control method according to claim 6, wherein the reward $r_t$ becomes a higher value as a network usage efficiency defined by a usage rate of a server included in the physical network and a usage rate of a link included in the physical network becomes higher, and becomes a higher value as a number of changes of the physical resource allocated to the virtual network increases.

12. The non-transitory computer readable medium according to claim 7, wherein:
a total number of virtual networks is N; and
the one or more instructions cause the computer to execute: selecting the agent $g_k$ that executes the action that represents the allocation of the virtual network that belongs to a k-th group out of groups each having a number of N/M virtual networks obtained by dividing the number of N virtual networks.

13. The non-transitory computer readable medium according to claim 12, wherein the one or more instructions cause the computer to execute:
selecting the agent $g_k$, where k=t mod M is satisfied.

14. The non-transitory computer readable medium according to claim 7, wherein the one or more instructions cause the computer to execute:
storing a tuple of the action $a_j^k$, the state $s_j$, and the state $s_{j+1}$ in a replay memory; and
randomly selecting the j, and updates the action value function Q with use of the action $a_j^k$, the state $s_j$, and the state $s_{j+1}$ included in a tuple corresponding to the j out of the tuple stored in the replay memory.

15. The non-transitory computer readable medium according to claim 7, wherein the reward $r_t$ becomes a higher value as a network usage efficiency defined by a usage rate of a server included in the physical network and a usage rate of a link included in the physical network becomes higher, and becomes a higher value as a number of changes of the physical resource allocated to the virtual network increases.

* * * * *